(12) United States Patent
Wells et al.

(10) Patent No.: US 10,863,410 B1
(45) Date of Patent: Dec. 8, 2020

(54) METHODS FOR PACKET DATA NETWORK SERVICE SLICING WITH MICROSEGMENTATION IN AN EVOLVED PACKET CORE AND DEVICES THEREOF

(71) Applicant: F5 Networks, Inc., Seattle, WA (US)

(72) Inventors: Vernon Wells, Seattle, WA (US);
Akihiko Maruse, Seattle, WA (US);
Barry Goh, Seattle, WA (US); Antonio Torzillo, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 16/363,188

(22) Filed: Mar. 25, 2019

Related U.S. Application Data (60) Provisional application No. 62/649,359, filed on Mar. 28, 2018.

(51) Int. Cl.
*H04W 40/02* (2009.01)
*H04L 12/725* (2013.01)
(Continued)

(52) U.S. Cl.
CPC ......... *H04W 40/02* (2013.01); *H04L 12/4633* (2013.01); *H04L 45/306* (2013.01);
(Continued)

(58) Field of Classification Search
CPC ..... H04W 40/02; H04W 28/08; H04W 28/10; H04W 48/18; H04W 88/16; H04W 88/18;
(Continued)

(56) References Cited

U.S. PATENT DOCUMENTS

2012/0084449 A1\* 4/2012 Delos Reyes ....... H04L 61/3075
709/229
2019/0190993 A1\* 6/2019 Yoshikawa ........... H04W 76/12
(Continued)

OTHER PUBLICATIONS

F5 Networks, Inc., "BIG-IP® Local Traffic Management: Basics", Manual, Jan. 18, 2019, 60 pages, vol. 13.0, F5 Networks, Inc., Retrieved from the Internet:<https://support.f5.com/content/kb/en-us/products/big-ip_ltm/manuals/product/ltm_basics-13-0-0/_jcr_content/pdfAttach/download/file.res/BIG-IP_Local_Traffic_Management__Basics.pdf>.
(Continued)

*Primary Examiner* — Paul H Masur
(74) *Attorney, Agent, or Firm* — Troutman Pepper Hamilton Sanders LLP (Rochester)

(57) ABSTRACT

Methods, non-transitory computer readable media, session director apparatuses, and network traffic management systems that facilitate packet data network (PDN) service slicing with microsegmentation in an evolved packet core are disclosed. With this technology, a create session request (CSR) general packet radio service (GPRS) tunneling protocol (GTP) control (GTP-c) message is intercepted. A lookup key is then determined based on content of the intercepted CSR GTP-c message. A PDN gateway (PGW) identifier for a PGW is obtained using a slice name obtained using the lookup key. The intercepted CSR GTP-c message is modified to include the obtained PGW identifier. Subsequently, the modified CSR GTP-c message is steered based on the obtained PGW identifier, such as directly to the PGW or to a serving gateway (SGW) module associated with the PGW.

20 Claims, 4 Drawing Sheets

(51) Int. Cl.
| | |
|---|---|
| *H04W 48/18* | (2009.01) |
| *H04W 88/18* | (2009.01) |
| *H04W 88/16* | (2009.01) |
| *H04L 12/46* | (2006.01) |
| *H04W 28/10* | (2009.01) |
| *H04L 12/741* | (2013.01) |
| *H04L 29/12* | (2006.01) |
| *H04W 28/08* | (2009.01) |

(52) U.S. Cl.
CPC ........ *H04L 45/745* (2013.01); *H04L 61/1511* (2013.01); *H04W 28/08* (2013.01); *H04W 28/10* (2013.01); *H04W 48/18* (2013.01); *H04W 88/16* (2013.01); *H04W 88/18* (2013.01)

(58) Field of Classification Search
CPC . H04L 12/4633; H04L 45/306; H04L 45/308; H04L 45/74; H04L 45/745; H04L 61/15; H04L 61/1505; H04L 61/1511
See application file for complete search history.

(56) References Cited

U.S. PATENT DOCUMENTS

| | | | | |
|---|---|---|---|---|
| 2019/0207778 A1* | 7/2019 | Qiao | .................... | H04M 15/82 |
| 2019/0297002 A1* | 9/2019 | Qian | ...................... | H04L 47/20 |

OTHER PUBLICATIONS

F5 Networks, Inc., "BIG-IP® Local Traffic Management: Getting Started with Policies", Manual, Dec. 27, 2017, 34 pages, vol. 13.0, F5 Networks, Inc., Retrieved from the Internet:<https://support.f5.com/content/kb/en-us/products/big-ip_ltm/manuals/product/bigip-local-traffic-policies-getting-started-13-0-0/_jcr_content/pdfAttach/download/file.res/BIG-IP_Local_Traffic_Management__Getting_Started_with_Policies.pdf>.

F5 Networks, Inc., "TMOS: Operations Guide", Manual, Dec. 2018, 226 pages, F5 Networks, Inc., Retrieved from the Internet:<https://support.f5.com/content/kb/en-us/products/big-ip_ltm/manuals/product/f5-tmos-operations-guide/_jcr_content/pdfAttach/download/file.res/f5-tmos-operations-guide.pdf>.

F5 Networks, Inc., "BIG-IP LTM-DNS Operation Guide", Manual, Dec. 2018, 135 pages, F5 Networks, Inc., Retrieved from the Internet:<https://support.f5.com/content/kb/en-us/products/big-ip_ltm/manuals/product/f5-ltm-dns-operations-guide/_jcr_content/pdfAttach/download_0/file.res/f5-ltmdns-operations-guide.pdf>.

F5 Networks, Inc., "BIG-IP® Local Traffic Manager™: Implementations", Manual, Mar. 4, 2019, 180 pages, vol. 13.0, F5 Networks, Inc., Retrieved from the Internet:<https://support.f5.com/content/kb/en-us/products/big-ip_ltm/manuals/product/ltm-implementations-13-0-0/_jcr_content/pdfAttach/download/file.res/BIG-IP_Local_Traffic_Manager__Implementations.pdf>.

F5 Networks, Inc., "BIG-IP® Service Provicer: Administration", Manual, Mar. 27, 2019, 24 pages, vol. 13.0, F5 Networks, Inc., Retrieved from the Internet:<https://support.f5.com/content/kb/en-us/products/big-ip_ltm/manuals/product/bigip-service-provider-administration-13-0-0/_jcr_content/pdfAttach/download/file.res/BIG-IP_Service_Provider__Administration.pdf>.

F5 Networks, Inc., "BIG-IP® Service Provider: Message Routing Administration", Manual, Jun. 15, 2018, 50 pages, vol. 13.0, F5 Networks, Inc., Retrieved from the Internet:<https://support.f5.com/content/kb/en-us/products/big-ip_ltm/manuals/product/bigip-service-provider-message-routing-administration-13-0-0/_jcr_content/pdfAttach/download/file.res/BIG-IP_Service_Provider__Message_Routing_Administration.pdf>.

F5 Networks, Inc., "BIG-IP® TMOS® : Routing Administration", Manual, Jan. 18, 2019, 120 pages, vol. 13.0, F5 Networks, Inc., Retrieved from the Internet:<https://support.f5.com/content/kb/en-us/products/big-ip_ltm/manuals/product/tmos-routing-administration-13-0-0/_jcr_content/pdfAttach/download/file.res/BIG-IP_TMOS__Routing_Administration.pdf>.

* cited by examiner

METHODS FOR PACKET DATA NETWORK SERVICE SLICING WITH MICROSEGMENTATION IN AN EVOLVED PACKET CORE AND DEVICES THEREOF

This application claims the benefit of U.S. Provisional Patent Application Ser. No. 62/649,359, filed Mar. 28, 2018, which is hereby incorporated by reference in its entirety.

FIELD

This technology generally relates to network traffic management and, more particularly, to methods and devices for facilitating packet data network service slicing with microsegmentation in an evolved packet core.

BACKGROUND

Driven in part by the Internet of Things (IoT) movement, a large number of new device types are connecting to 3rd generation partnership project (3GPP) networks. For 3GPP service providers, it is desirable to segment traffic from specific device classes to specialized packet data networks (PDNs). This segmentation is done for three primary reasons.

First, it allows service providers to provision additional support services (e.g., private cloud telemetry data receivers) inside their own environment. For the IoT device provider, this reduces traffic latency, increases security, and may reduce transport cost. For the 3GPP service provider, it provides an opportunity for additional monetization of these systems. Second, the use of specialized PDNs allows for sophisticated controls and policies beyond what is provided by 3GPP defined standards. Third, particularly with the adoption of pervasive network function virtualization (NFV) in 3GPP service provider and IoT provider infrastructures, it allows for scaling up and scaling down of support infrastructure for specific device classes independent of scale for unrelated infrastructure.

In a 3GPP environment, the PDN is selected based on the default or asserted access point name (APN). APNs, however, can be time-consuming and costly to implement and maintain. Moreover, providers may wish to choose different PDNs based on the physical location of a device. This leads to massive APN proliferation, and if the device is mobile between different logical regions, APNs cannot feasibly be used at all.

SUMMARY

A method for facilitating packet data network (PDN) service slicing with microsegmentation in an evolved packet core (EPC) implemented in cooperation with a network traffic management system that includes one or more session director apparatuses, client devices, mobility management entity (MME) devices, serving gateway (SGW) devices, PDN gateway (PGW) devices, external data store devices, or server devices is disclosed. A create session request (CSR) general packet radio service (GPRS) tunneling protocol (GTP) control (GTP-c) message is intercepted. A lookup key is then determined based on content of the intercepted CSR GTP-c message. A PGW identifier for a PGW is obtained using a slice name obtained using the lookup key. The intercepted CSR GTP-c message is modified to include the obtained PGW identifier. Subsequently, the modified CSR GTP-c message is steered based on the obtained PGW identifier.

A session director apparatus includes memory including programmed instructions stored thereon and one or more processors configured to be capable of executing the stored programmed instructions to intercept a GTP-c message. A lookup key is then determined based on content of the intercepted CSR GTP-c message. A PGW identifier for a PGW is obtained using a slice name obtained using the lookup key. The intercepted CSR GTP-c message is modified to include the obtained PGW identifier. Subsequently, the modified CSR GTP-c message is steered based on the obtained PGW identifier.

A non-transitory computer readable medium having stored thereon instructions for facilitating PDN service slicing with microsegmentation in an EPC includes executable code that, when executed by one or more processors, causes the processors to intercept a GTP-c message. A lookup key is then determined based on content of the intercepted CSR GTP-c message. A PGW identifier for a PGW is obtained using a slice name obtained using the lookup key. The intercepted CSR GTP-c message is modified to include the obtained PGW identifier. Subsequently, the modified CSR GTP-c message is steered based on the obtained PGW identifier.

A network traffic management system includes one or more session director apparatuses, client devices, MME devices, SGW devices, PGW devices, external data store devices, or server devices, memory comprising programmed instructions stored thereon, and one or more processors configured to be capable of executing the stored programmed instructions to intercept a GTP-c message. A lookup key is then determined based on content of the intercepted CSR GTP-c message. A PGW identifier for a PGW is obtained using a slice name obtained using the lookup key. The intercepted CSR GTP-c message is modified to include the obtained PGW identifier. Subsequently, the modified CSR GTP-c message is steered based on the obtained PGW identifier.

This technology has a number of associated advantages including providing methods, non-transitory computer readable media, session director apparatuses, and network traffic management systems that facilitate steering of connection in mobile networks using virtual access point names (APNs) (i.e., slice names) that can be provisioned relatively quickly and do not have to be globally-defined. In particular, service providers can be provided with slice name(s), which can be used to steer CSR GTP-c messages and associated connections to PGW devices. This technology also uses location information extracted upon receipt of a CSR GTP-c message from a mobile device to determine lookup keys and slice names, and steers connections to particular PGW devices and associated PDNs based on the location of the mobile devices using the slice names.

DETAILED DESCRIPTION

Figure 1:
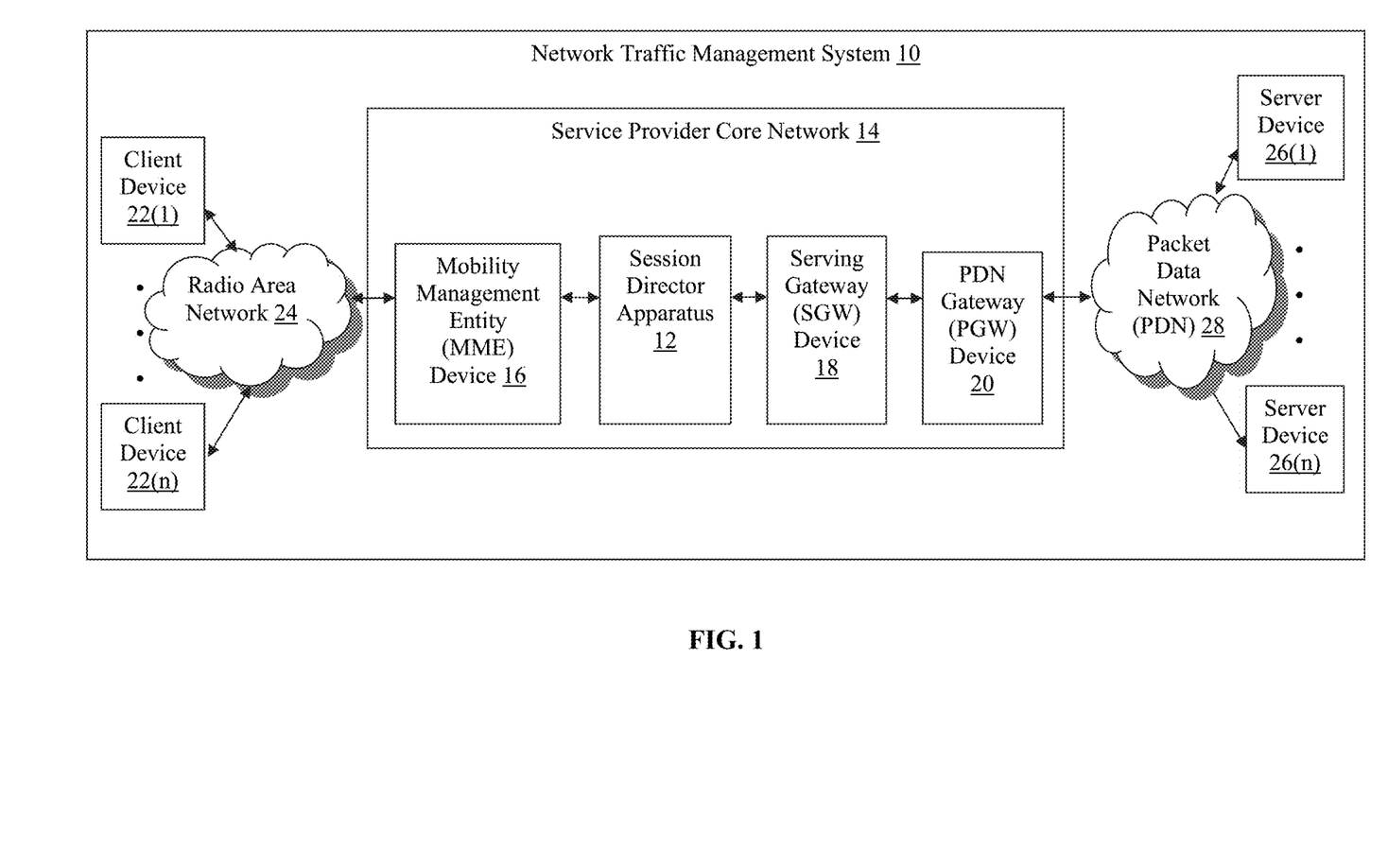
FIG. 1 is a block diagram of an exemplary network traffic management system with a session director apparatus.

Referring to FIG. 1, an exemplary network environment that incorporates an exemplary network traffic management system 10 is illustrated. The network traffic management system 10 in this example includes a session director apparatus 12, which is within a service provider or evolved packet core (EPC) network 14 that also includes a mobility management entity (MME) 16 device, service gateway (SGW) 18 device, and packet data network (PDN) gateway (PGW) device 20. The MME device 16 is coupled to client devices 22(1)-22(n) by a radio access network (RAN) 24 and the PGW device 20 is coupled to server devices 26(1)-26(n) via a PDN 28 in this example, although the session director apparatus 12, MME device 16, SGW device 18, PGW device 20, client devices 22(1)-22(n), and/or server devices 26(1)-26(n) may be coupled together via other topologies.

In particular, the session director apparatus 12 could be disposed between the SGW device 18 and PGW device 20 and the service provider core network 14 can include any number of MME devices, session director apparatuses, SGW devices, and/or PGW devices in other examples. Additionally, the network traffic management system 10 may include other network devices such as one or more routers and/or switches, for example, which are well known in the art and thus will not be described herein. This technology provides a number of advantages including methods, non-transitory computer readable media, network traffic management systems, and session director apparatuses that facilitate PDN service slicing, and relatively fast access point name (APN) provisioning, with location-based and other types of microsegmentation.

In this particular example, the session director apparatus 12, MME device 16, SGW device 18, PGW device 20, client devices 22(1)-22(n), and server devices 26(1)-26(n) are disclosed in FIG. 1 as dedicated hardware devices. However, one or more of the session director apparatus 12, MME device 16, SGW device 18, PGW device 20, client devices 22(1)-22(n), or server devices 26(1)-26(n) can also be implemented in software within one or more other devices in the network traffic management system 10.

Figure 2:
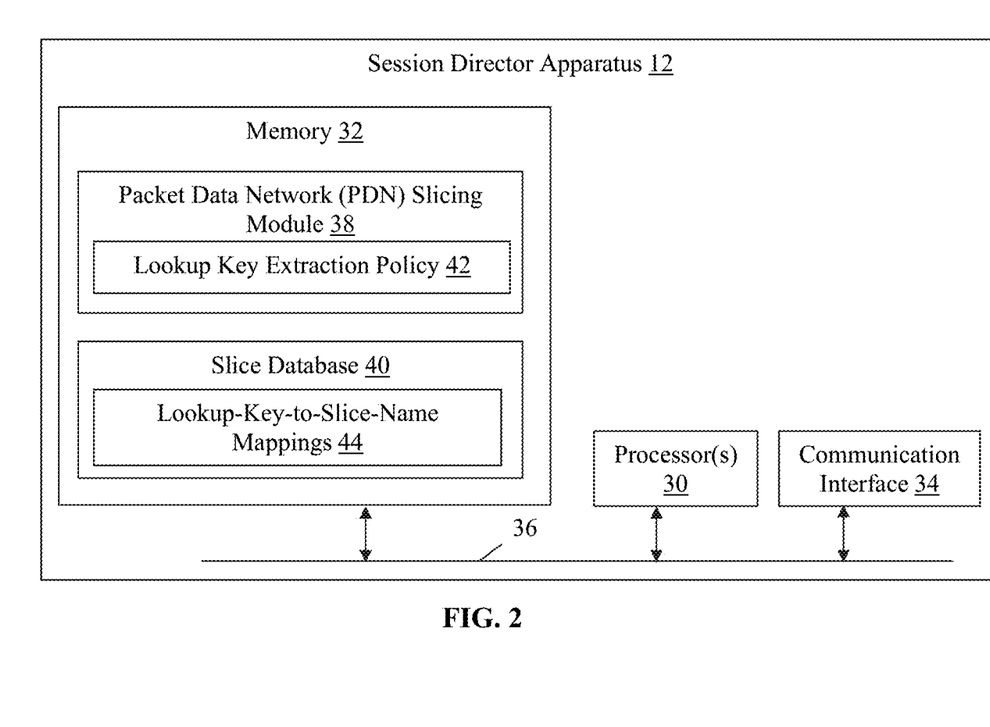
FIG. 2 is a block diagram of an exemplary session director apparatus.

Referring to FIGS. 1-2, the session director apparatus 12 of the network traffic management system 10 may perform any number of functions including directing general packet radio service (GPRS) tunneling protocol (GTP) sessions or connections, managing network traffic, load balancing network traffic, and/or accelerating network traffic originating with the client devices 22(1)-22(n), for example. The session director apparatus 12 includes processor(s) 30, a memory 32, and a communication interface 34, which are coupled together by a bus 36 or other communication link, although the session director apparatus 12 can include other types and/or numbers of elements in other configurations.

The processor(s) 30 of the session director apparatus 12 may execute programmed instructions stored in the memory 32 of the session director apparatus 12 for any number of the functions identified above. The processor(s) 30 of the session director apparatus 12 may include one or more central processing units (CPUs) or general purpose processors with one or more processing cores, for example, although other types of processor(s) can also be used.

The memory 32 of the session director apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 30, can be used for the memory 32.

Figure 3:
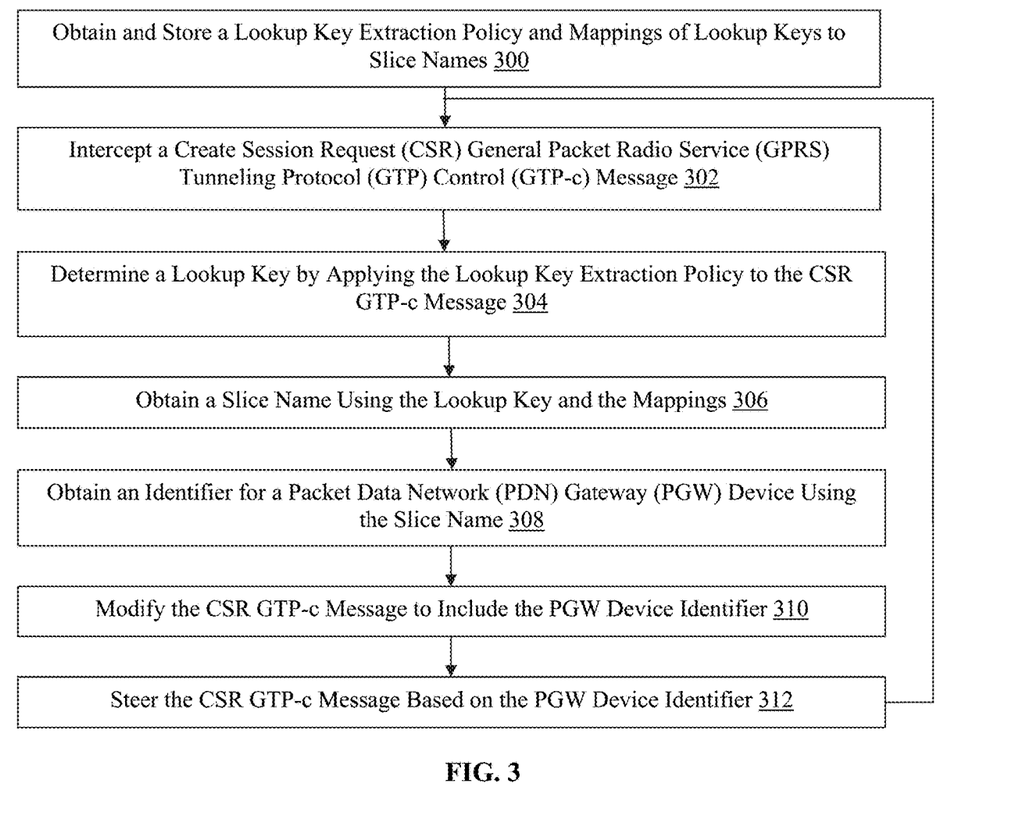
FIG. 3 is a flowchart of an exemplary method for facilitating packet data network (PDN) service slicing with microsegmentation in an evolved packet core (EPC)

Accordingly, the memory of the session director apparatus can store application(s) that can include computer executable instructions that, when executed by the session director apparatus 12, cause the session director apparatus 12 to perform actions, such as to transmit, receive, or otherwise process messages, for example, and to perform other actions described and illustrated below with reference to FIGS. 3-4. The application(s) can be implemented as components of other applications and/or operating system extensions, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the session director apparatus 12 itself, may be located in virtual server(s) running in a cloud-based computing environment rather than being tied to one or more specific physical network computing devices. Also, the application(s) may be running in one or more virtual machines (VMs) executing on the session director apparatus 12. Additionally, in one or more embodiments of this technology, virtual machine(s) running on the session director apparatus 12 may be managed or supervised by a hypervisor.

In this particular example, the memory 32 of the session director apparatus 12 includes a PDN slicing module 38 and a slice database 40, although other types or numbers of modules, applications, or databases can be used in other examples. The PDN slicing module 38 facilitates steering of connections initiated by the client devices 22(1)-22(n) to particular PDN devices via PGW devices (e.g., PGW device 20) and according to established slice names associated with the PDNs (e.g., PDN 28). The slice names operate effectively as lightweight APNs.

The PDN slicing module 38 in this example includes a lookup key extraction policy 42 that is obtained (e.g., from a host of the service provider core network 14 or a mobile virtual network operator (MVNO)), stored, and applied to received create session request (CSR) GTP control (GTP-c) messages to determine a lookup key. The lookup key is then used to obtain a slice name, which corresponds to an identifier for a PGW device (e.g., PGW device 20) associated with a particular PDN (e.g., PDN 28). The CSR GTP-c message is modified based on the PGW identifier in order to steer the CSR GTP-c message and associated connection to the associated PGW device and corresponding PDN.

Accordingly, the slice name is used by the session director apparatus 12 to steer connections without requiring an APN that is globally-defined and relatively expensive to provision. Since the slice name is not globally-defined, this technology advantageously facilitates geographic microsegmentation. In particular, connections can be distributed to PDNs that are utilized for particular geographic regions, for example. The operation of the PDN slicing module 38 is described and illustrated in more detail later with reference to FIGS. 3-4.

The PDN slicing module 38 utilizes the slice database 40 to obtain slice names from lookup keys extracted from CSR GTP-c messages. Accordingly, the slice database 40 includes look-up-to-slice-name mappings 44 in this example, although slice names can be determined from lookup keys in other ways. The slice database 40 in some examples can also include mappings of slice names to PGW identifiers, although the PGW identifiers can be obtained in other ways and the slice database 40 can also include other information in other examples. In particular, the PGW identifiers in other examples can also be obtained from external data sources, such as representational state transfer (REST) web service modules, lightweight directory access protocol (LDAP) modules, active directory (AD) modules, or Diameter endpoint modules, as described and illustrated in more detail later.

The communication interface 34 of the session director apparatus 12 operatively couples and communicates between the session director apparatus 12, the MME device 16, and the SGW device 18. The MME device 16 is coupled to the client devices 22(1)-22(n) via the RAN 28 and the SGW device 18 is coupled to a PGW device 20 that communicates with servers 26(1)-26(n) via the PDN 28, although other types and/or numbers of communication networks or systems with other types and/or numbers of connections and/or configurations to other devices and/or elements can also be used. By way of example only, the PDN 28 can include local area network(s) (LAN(s)) or wide area network(s) (WAN(s) (e.g. the Internet)), and can use TCP/IP over Ethernet and industry-standard protocols, although other types and/or numbers of protocols and/or communication networks can be used.

While the session director apparatus 12 is illustrated in this example as including a single device, the session director apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the session director apparatus 12.

Each of the MME device 16, SGW device 18, and PGW device 20 in this example includes a processor, a memory, and a communications interface, which are coupled together by a bus or other communication link, although other numbers and types of devices could also be used. The MME device 16 is the interface between the RAN 28 (e.g., an long term evolution (LTE) or 2G/3G access network) and the service provider core network 14. The MME device 16 also controls roaming behaviors and enforces roaming restrictions for the client devices 22(1)-22(n) and facilitates authentication and security key management, for example, along with other services.

Additionally, the MME device 16 selects an SGW device (e.g., SGW device 18) to which a connection with one of the client devices 22(1)-22(n) is directed, such as based on a response to a DNS query using an APN identified in a CSR GTP-c message received from the one of the client devices 22(1)-22(n), which includes an identifier for a PGW device (e.g., PGW device 20) associated with the selected SGW device. With this technology, the selection of the SGW device by the MME device 16 is effectively ignored or altered to facilitate steering of CSR GTP-c messages and associated connections, based on content of the CSR GTP-c messages, to particular PDNs (e.g., PDN 28) via SGW and PGW device pairs, as described and illustrated in more detail later.

The SGW device 18 in this example is an anchor point that effectively anchors user sessions originating from the client devices 22(1)-22(n). Accordingly, the SGW device 18 routes and forwards user data packets and manages and stores user equipment (UE) contexts, among other services.

The SGW device 18 pairs with the PGW device 20, which is an interface between the service provider core network 14 and the PDN 28. Accordingly, the PGW device 20 performs policy enforcement and packet filtering, among other services. The PGW device 20 can be coupled to any number of PDNs in other examples.

Figure 4:
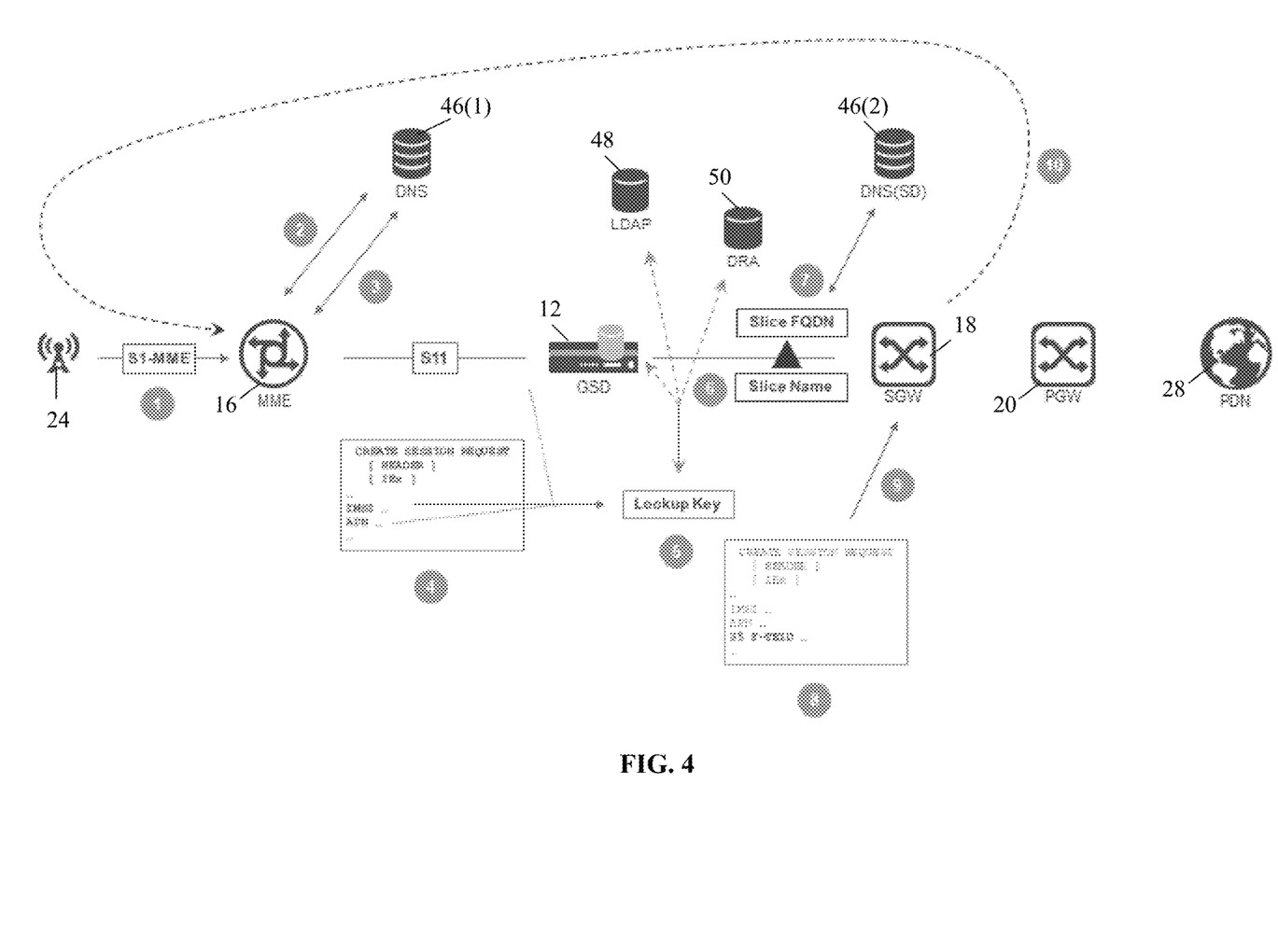
FIG. 4 is a flow diagram of an exemplary method for facilitating PDN service slicing with microsegmentation in an EPC.

Additionally, while only one SGW device 18 and one PGW device 20 is illustrated in FIGS. 1 and 4 for simplicity in order to describe one example of this technology, in other examples, a plurality of SGW devices are connected to the session director apparatus 12, one or more of which is coupled to each of a plurality of PGW devices. The session director apparatus 12 can then load balance CSR GTP-c messages across SGW devices associated with a particular PGW device for which a PGW identifier was obtained based on a slice name, as described and illustrated in more detail later.

Each of the server devices 26(1)-26(n) in this example includes one or more processors, a memory, and a communication interface, which are coupled together by a bus or other communication link, although other numbers and/or types of network devices could be used. The server devices 26(1)-26(n) in this example can host data or applications accessible by the client devices 22(1)-22(n), although connections from the client devices 22(1)-22(n) can be facilitated with other types of devices coupled to the PDN in other examples.

In this example, the server devices 26(1)-26(n) can process requests received from the client devices 22(1)-22(n) according to the HTTP-based application RFC protocol, for example, although other protocols can also be used. Various applications may be operating on the server devices 26(1)-26(n) and transmitting data (e.g., files or web pages) to the client devices 22(1)-22(n) in response to requests from the client devices 22(1)-22(n). The server devices 26(1)-26(n) may be hardware or software or may represent a system with multiple servers in a pool, which may include internal or external networks.

The client devices 22(1)-22(n) in this example include any type of computing device that can communicate via the RAN 24, such as mobile computing devices, mobile phones, and other wireless connection user equipment (UE) devices. Each of the client devices 22(1)-22(n) in this example includes a processor, a memory, and a communication interface, which are coupled together by a bus or other communication link, although other numbers and/or types of network devices could be used.

The client devices 22(1)-22(n) may run interface applications, such as web browsers or standalone client applications, which may provide an interface to make requests for, and receive content stored on, one or more of the server devices 26(1)-26(n) via the RAN 24 and PDN 28. The client devices 22(1)-22(n) may further include a display device, such as a display screen or touchscreen, and/or an input device, such as a keyboard for example.

Although the exemplary network traffic management system 10 with the session director apparatus 12, MME device 16, SGW device 18, PGW device 20, client devices 22(1)-22(n), server devices 26(1)-26(n), RAN 24, and PDN 28 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the session director apparatus 12, MME device 16, SGW device 18, PGW device 20, client devices 22(1)-22(n), or server devices 26(1)-26(n), for example, may be configured to operate as virtual instances on the same physical machine. In other words, one or more of the session director apparatus 12, MME device 16, SGW device 18, PGW device 20, client devices 22(1)-22(n), or server devices 26(1)-26(n) may operate on the same physical device rather than as separate devices communicating through communication network(s). Additionally, there may be more or fewer session director apparatuses, MME devices, SGW devices, PGW devices, client devices, or server devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only wireless traffic networks, cellular traffic networks, PDNs, the Internet, intranets, and combinations thereof.

The examples may also be embodied as one or more non-transitory computer readable media having instructions stored thereon, such as in the memory 32, for one or more aspects of the present technology as described and illustrated by way of the examples herein. The instructions in some examples include executable code that, when executed by one or more processors, such as the processor(s) 30, cause the processors to carry out steps necessary to implement the methods of the examples of this technology that are described and illustrated herein.

Exemplary methods of PDN service slicing with microsegmentation in an EPC will now be described with reference to FIGS. 1-4. Referring more specifically to FIG. 3, a flowchart of an exemplary method of facilitating PDN service slicing with microsegmentation in an EPC is illustrated. In step 300 in this example, the session director apparatus 12 of the network traffic management system 10 obtains and stores in the memory 32 the lookup key extraction policy 42 and the mappings of lookup keys to slice names 44. The lookup key extraction policy 42 can include rule(s) to be applied to obtain CSR GTP-c messages in order to extract a lookup key. With the lookup key, the session director apparatus 12 can obtain a corresponding slice name from the obtained mappings of lookup keys to slice names 44.

In step 302, the session director apparatus 12 intercepts a CSR GTP-c message, which is sent from the MME device 16 in this example. In other examples in which the session director apparatus 12 is disposed between the SGW device 18 and PGW device 20, the CSR GTP-c message can be sent from the SGW device 18. The CSR GTP-c message originates from one of the client devices 22(1)-22(n) that is attempting to establish a connection with an endpoint on a PDN (e.g., PDN 28), such as one of the server devices 26(1)-26(n).

In step 304, the session director apparatus 12 determines a lookup key by applying the lookup key extraction policy 42 to the intercepted CSR GTP-c message. In one particular example, the lookup key extraction policy 42 includes a rule requiring extraction of a set of initial digits of an international mobile subscriber identity (IMSI) included in the CSR GTP-c message as the lookup key. In this example, the set of initial digits of the IMSI can correspond to a class of devices (e.g., Internet of things (IOT) devices), which are to be steered to a particular PDN, such as for security or other purposes, for example.

In other examples, the lookup key extraction policy 42 can be applied to different content or data within the CSR GTP-c message such as the international mobile equipment identity (IMEI), destination PDN type (e.g., IPv4 or IPv6), location information, or radio type, for example. In yet other examples, the lookup key extraction policy 42 can include rule(s) associated with a function or algorithm to be applied to content of the CSR GTP-c message and/or external information to generate the lookup key, and the lookup key can also be determined based on other information and in other manners in other examples.

In step 306, the session director apparatus 12 obtains a slice name using the lookup key and the stored lookup-key-to-slice-name mappings 44. Accordingly, the session director apparatus 12 identifies the slice name that corresponds with the lookup key. The slice name is a virtual APN associated with a PDN and can be associated with any number of lookup keys.

In one example, an MVNO may host only the PGW 20 of the service provider core network 14, and may want to route connections with certain of the client devices 22(1)-22(n) through the PGW device 20 to the PDN 28. Instead of provisioning a globally-defined APN, which requires a significant amount of time and resources, the MVNO can provide the slice name to the session director apparatus 12 with this technology in order to facilitate steering of the traffic to particular PGW devices and PDNs.

In another example, the PDN 28 can be a quarantine PDN and the lookup key can correspond with a subscriber known to be a security threat (e.g., as detected by a central security intelligence system such as a security information and event management (STEM) system). In this example, the subscriber can be flagged based on an associated identifier and steered to the quarantine PDN 28 for further processing, such as deep packet inspection, protocols inspection, or behavioral analysis of the subscriber.

In yet another example in which the lookup key extraction policy 42 results in extraction of the radio type, by detecting that a radio type is 5G, the session can be directed to the PDN 28, which is specific to the radio service, such as a mass device IoT network with IoT application servers or an ultra broadband PDN capable of handling the 5G bandwidths, in order to segment traffic per a specific application-based PDN. Other motivations for creating and utilizing slice names by other types of entities can also be used in other examples.

In step 308, the session director apparatus 12 obtains an identifier for the PGW device 20 using the slice name. In one example, the slice name can be associated with one or more PGW devices in the slice database 40 in the memory 32. The mappings of slice names to PGW identifiers can be obtained and stored in step 300 in this example. In another example, the session director apparatus 12 sends a domain name system (DNS) query including the obtained slice name to a DNS server and receives the PGW identifier in response to the DNS query. In this example, the PGW identifier is an Internet protocol (IP) address of the PGW device 20.

In yet other examples, other types of external data sources can also be used to resolve a PGW identifier using a slice name. For example, the PGW identifier can be obtained using a representation state transfer (REST) web service device, a lightweight directory access protocol (LDAP)

device, via an active directory (AD) device, or a Diameter endpoint device, and other types of internal and/or external data sources can also be used to obtain the PGW identifier.

In step 310, the session director apparatus 12 modifies the CSR GTP-c message, which was intercepted in step 302, at least to include the PGW identifier obtained in step 308. In one particular example, the session director apparatus 12 modifies the intercepted CSR GTP-c message by replacing a fully qualified tunnel endpoint identifier (F-TEID) with the obtained PGW identifier. In other examples, the APN may also be modified (e.g., replaced with the slice name) and other types of modifications can also be made to the intercepted CSR GTP-c message.

In step 312, the session director apparatus 12 steers the modified CSR GTP-c message based on the PGW identifier obtained in step 308. In this example, the modified CSR GTP-c message is steered to the SGW device 18 associated with the PGW 30 corresponding to the PGW identifier. Optionally, in some examples, the session director apparatus 12 identifies the SGW device 18 based on a load balancing policy. The selected SGW device 18 can then route the CSR GTP-c message based on the PGW identifier included therein. In other examples in which the session director apparatus 12 is disposed between the SGW device 18 and the PGW device 20, the modified CSR GTP-c message is steered directly to the PGW device 20 based on the PGW device identifier (e.g., IP address).

Referring more specifically to FIG. 4, a flow diagram of an exemplary method of facilitating PDN service slicing with microsegmentation in an EPC is illustrated. In a first step in this example, a CSR GTP-c message is received at the MME device 16. The CSR GTP-c message is sent over the RAN 24 and originates from a client (not shown) in this example. Accordingly, the client is attempting to access a PDN (e.g., PDN 28), which is associated with an APN that is inserted into the CSR GTP-c message (e.g., as determined by a web browser of the client).

In a second step, the MME device 16 generates and sends a DNS query to a DNS server device 46(1) that includes the APN identified in the CSR GRP-c message. In another examples, the APN can be a default APN selected by the MME device 16.

In a third step, the MME device 16 receives a PGW identifier in response to the DNS query and inserts the PGW identifier into the CSR GTP-c message, which is forwarded toward the SGW device 18. The SGW device 18 is associated with the PGW device 20 corresponding to the identifier returned in response to the DNS query.

In a fourth step, the session director apparatus 12 intercepts the CSR GTP-c message and applies the lookup key extraction policy 42 to the CSR GTP-c message. The lookup key extraction policy 42 can require that the session director apparatus 12 utilize various content of the CSR GTP-c message, such as the IMSI or IMEI, for example, to generate, extract, or otherwise obtain a lookup key.

Accordingly, in a fifth step, the session director apparatus 12 obtains the lookup key as a result of the application of the lookup key extraction policy 42.

In a sixth step, the session director apparatus 12 uses the lookup key obtained in the fifth step to obtain a slice name. The session director apparatus 12 can utilize an internal data source, such as the slice database 40, to identify a slice name corresponding to the lookup key. In other examples, the session director apparatus 12 can use an external data source, such as the LDAP device 48 or Diameter routing agent (DRA) device 50, for example, although other types of external data sources can also be used.

In a seventh step, the session director apparatus 12 uses the slice name to obtain an identifier for the PGW device 20. In this particular example, the slice name is a FQDN and the session director apparatus 12 generates and sends a DNS query including the slice name to a DNS server 46(2), which returns an IP address for the PGW device 20 in response. However, in other examples, other types of slice names can be used and/or the PGW identifier can be obtained from an internal or a different external data source.

In a eighth step, the session director apparatus 12 modifies the intercepted CSR GTP-c message at least to include the PGW identifier. In this example, the session director apparatus 12 replaces the F-TEID with the PGW identifier, although other types of modifications can also be used. For example, the APN can be replaced with the slice name. As the PGW device 20 corresponding to the PGW identifier may be associated with multiple PDNs, the slice name can be used to direct the modified CSR GTP-c message.

In a ninth step, the session director apparatus 12 sends the modified CSR GTP-c message to the SGW 18. The SGW device 18 can be selected based on a load balancing decision, for example, although other methods of identifying the SGW device 18 can also be used in other examples. The SGW device 18 will subsequently forward the modified CSR GTP-c message to the PGW device 20 based on the PGW identifier included therein, and the PGW device 20 will communicate with the PDN 28 in response. Accordingly, the slice name operates as a virtual APN in this example in order to facilitate steering of the CSR GTP-c message and associated connection to a particular PGW device 20 and PDN 28.

In a tenth step, the SGW 18 can send a message directly to the MME device 16 in response to the modified CSR GTP-c message. In this example, the session director apparatus 12 does not modify certain portions of the CSR GTP-c message (e.g., associated with a source of the message), such that modified CSR GTP-c message appears to be sent from the MME device 16 (instead of the session director apparatus 12) from the perspective of the SGW device 18. In another example in which the session director apparatus 12 is disposed between the SGW device 18 and the PGW device 20, the session director apparatus 12 can retain the identification of the SGW device 18 as the origin of the CSR GTP-c message.

Therefore, the CSR GTP-c message will appear to the selected SGW device 18 or PGW device 20 as though the MME 16 or the SGW 18, respectively, originated the CSR GTP-c message based on the origin F-TEID included therein. More generally, message types following the CSR that are irrelevant to slice name selection, such as modify session requests and responses and delete session requests and responses, can be directly communicated between the MME device 16, SGW device 18, and PGW device 20 without involvement of the session director apparatus 12. Accordingly, the impact of the insertion of the session director apparatus 12 into existing network architecture is reduced as subsequent control plane call flows can resume without the involvement of the session director apparatus 12.

Accordingly, with this technology, connections in mobile networks can be steered using virtual APNs (i.e. slice names) that can be provisioned relatively quickly and do not have to be globally-defined. Accordingly, MVNOs, for example, can provide service providers with slice name(s), which can be used to steer CSR GTP-c messages and associated connections to PGWs associated with the MVNOs. This technology also facilitates location-based microsegmentation by using location information extracted upon receipt of CSR GTP-c messages from mobile devices to determine lookup keys and slice names, and steering of connections to particular PGWs and associated PDNs based on the location of the mobile devices using the slice names.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for packet data network (PDN) service slicing implemented by a network traffic management system comprising one or more session director apparatuses, client devices, mobility management entity (MME) devices, serving gateway (SGW) devices, PDN gateway (PGW) devices, external data store devices, or server devices, and the method comprising:
   determining a lookup key based on content of an intercepted create session request (CSR) general packet radio service (GPRS) tunneling protocol (GTP) control (GTP-c) message;
   obtaining using the determined lookup key a slice name and using the obtained slice name to obtain a PGW identifier for a PGW;
   modifying the intercepted CSR GTP-c message to include the obtained PGW identifier; and
   steering the modified CSR GTP-c message based on the obtained PGW identifier, wherein the steered CSR GTP-c message comprises a source Internet protocol (IP) address of the intercepted CSR GTP-c message.

2. The method of claim 1, further comprising selecting the SGW from a plurality of SGWs.

3. The method of claim 1, further comprising querying an external data source based on the obtained slice name to obtain the PGW identifier, wherein the external data source is a representational state transfer (REST) web service, lightweight directory access protocol (LDAP), active directory (AD), or Diameter endpoint.

4. The method of claim 1, further comprising replacing a fully qualified tunnel endpoint identifier (F-TEID) in the intercepted CSR GTP-c message with the obtained PGW identifier to generate the modified CSR GTP-c message.

5. The method of claim 1, wherein the intercepted CSR GTP-c message is further modified to include the obtained slice name.

6. A session director apparatus, comprising a memory comprising programmed instructions stored thereon and a processor configured to be capable of executing the stored programmed instructions to:
   determine a lookup key based on content of an intercepted create session request (CSR) general packet radio service (GPRS) tunneling protocol (GTP) control (GTP-c) message;
   obtain using the determined lookup key a slice name and using the obtained slice name to obtain a PGW identifier for a PGW;
   modify the intercepted CSR GTP-c message to include the obtained PGW identifier; and
   steer the modified CSR GTP-c message based on the obtained PGW identifier, wherein the steered CSR GTP-c message comprises a source Internet protocol (IP) address of the intercepted CSR GTP-c message.

7. The session director apparatus of claim 6, wherein the processor is further configured to be capable of executing the stored programmed instructions to select the SGW from a plurality of SGWs.

8. The session director apparatus of claim 6, wherein the processor is further configured to be capable of executing the stored programmed instructions to query an external data source based on the obtained slice name to obtain the PGW identifier, wherein the external data source is a representational state transfer (REST) web service, lightweight directory access protocol (LDAP), active directory (AD), or Diameter endpoint.

9. The session director apparatus of claim 6, wherein the processor is further configured to be capable of executing the stored programmed instructions to replace a fully qualified tunnel endpoint identifier (F-TEID) in the intercepted CSR GTP-c message with the obtained PGW identifier to generate the modified CSR GTP-c message.

10. The session director apparatus of claim 6, wherein the intercepted CSR GTP-c message is further modified to include the obtained slice name.

11. A non-transitory computer readable medium having stored thereon instructions for packet data network (PDN) service slicing comprising executable code which when executed by one or more processors, causes the processors to:
   determine a lookup key based on content of an intercepted create session request (CSR) general packet radio service (GPRS) tunneling protocol (GTP) control (GTP-c) message;
   obtain using the determined lookup key a slice name and using the obtained slice name to obtain a PGW identifier for a PGW;
   modify the intercepted CSR GTP-c message to include the obtained PGW identifier; and
   steer the modified CSR GTP-c message based on the obtained PGW identifier, wherein the steered CSR GTP-c message comprises a source Internet protocol (IP) address of the intercepted CSR GTP-c message.

12. The non-transitory computer readable medium of claim 11, wherein the executable code when executed by the processors further causes the processors to select the SGW from a plurality of SGWs based on an application of a load balancing policy.

13. The non-transitory computer readable medium of claim 11, wherein the executable code when executed by the processors further causes the processors to query an external data source based on the obtained slice name to obtain the PGW identifier, wherein the external data source is a representational state transfer (REST) web service, lightweight directory access protocol (LDAP), active directory (AD), or Diameter endpoint.

14. The non-transitory computer readable medium of claim 11, wherein the executable code when executed by the processors further causes the processors to replace a fully qualified tunnel endpoint identifier (F-TEID) in the intercepted CSR GTP-c message with the obtained PGW identifier to generate the modified CSR GTP-c message.

15. The non-transitory computer readable medium of claim 11, wherein the intercepted CSR GTP-c message is further modified to include the obtained slice name.

16. A network traffic management system, comprising one or more session director apparatuses, client devices, mobility management entity (MME) devices, serving gateway (SGW) devices, packet data network (PDN) gateway (PGW) devices, external data store devices, or server devices with memory comprising programmed instructions stored thereon and one or more processors configured to be capable of executing the stored programmed instructions to:
- determine a lookup key based on content of an intercepted create session request (CSR) general packet radio service (GPRS) tunneling protocol (GTP) control (GTP-c) message;
- obtain using the determined lookup key a slice name and using the obtained slice name to obtain a PGW identifier for a PGW;
- modify the intercepted CSR GTP-c message to include the obtained PGW identifier; and
- steer the modified CSR GTP-c message based on the obtained PGW identifier, wherein the steered CSR GTP-c message comprises a source Internet protocol (IP) address of the intercepted CSR GTP-c message.

17. The network traffic management system of claim 16, wherein the one or more processors are further configured to be capable of executing the stored programmed instructions to select the SGW from a plurality of SGWs based on an application of a load balancing policy.

18. The network traffic management system of claim 16, wherein the one or more processors are further configured to be capable of executing the stored programmed instructions to query an external data source based on the obtained slice name to obtain the PGW identifier, wherein the external data source is a representational state transfer (REST) web service, lightweight directory access protocol (LDAP), active directory (AD), or Diameter endpoint.

19. The network traffic management system of claim 16, wherein the one or more processors are further configured to be capable of executing the stored programmed instructions to replace a fully qualified tunnel endpoint identifier (F-TEID) in the intercepted CSR GTP-c message with the obtained PGW identifier to generate the modified CSR GTP-c message.

20. The network traffic management system of claim 16, wherein the intercepted CSR GTP-c message is further modified to include the obtained slice name.

* * * * *